April 7, 1953  G. H. POHM  2,634,392

RECTIFYING ARRANGEMENT

Filed June 17, 1949

INVENTOR.
GEORGE H. POHM

BY *Hoodling and Kost*
ATTORNEYS

Patented Apr. 7, 1953

2,634,392

UNITED STATES PATENT OFFICE 2,634,392

RECTIFYING ARRANGEMENT

George H. Pohm, Lorain, Ohio, assignor to Lorain Products Corporation, a corporation of Ohio Application June 17, 1949, Serial No. 99,747

9 Claims. (Cl. 321—5)

This invention deals with a new and improved rectifying arrangement which operates from a source of alternating current and utilizes a leakage-reactance transformer having a saturable core in combination with a capacitor and a polyphase rectifier to supply a regulated output voltage, which may be held constant with a high degree of accuracy in spite of variations of the voltage of the alternating current supply and variations of the load on the rectifiers. This invention constitutes an improvement over the rectifying arrangement shown in United States Patent No. 2,364,558, issued December 5, 1944, to C. P. Stocker.

It is an object of this invention to provide improved means for maintaining a constant output voltage in a regulated rectifying arrangement.

A further object of this invention is to combine a leakage-reactance transformer with a capacitor to saturate the core of the transformer and to energize the capacitor from a combination of windings on the transformer whereby a regulated voltage is produced across the capacitor.

Another object of this invention is to provide a rectifying arrangement which can compensate for a relatively high value of resistance in the rectifier circuit and a relatively wide range of alternating current supply voltages and maintain a constant output voltage with variable load.

Other objects and a better understanding of my invention will be obtained from the following specification and claims, together with the accompanying drawing, in which:

Figure 1:
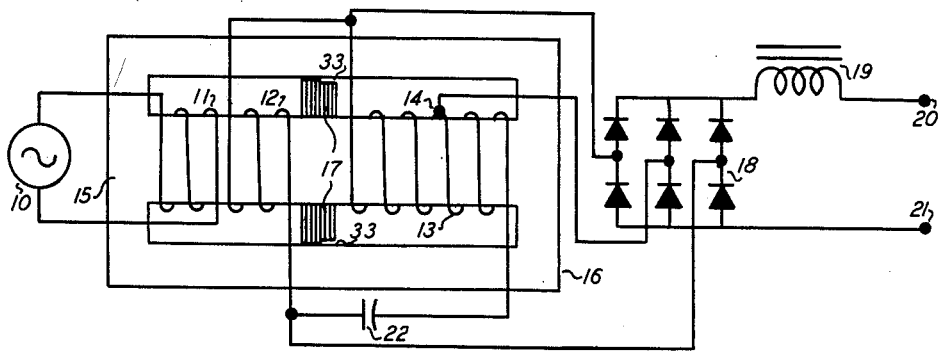
Figure 1 shows an embodiment of my invention utilizing a leakage-reactance transformer having windings thereon connected to a three-phase rectifier for supplying a regulated rectified output voltage.

In the practice of my invention, I employ a leakage-reactance transformer having primary and secondary windings. The core of the leakage-reactance transformer has two flux paths having a common portion, and some flux may thread through the one winding without threading through the other winding. By suitably proportioning the core and by connecting a capacitor in a closed circuit including the secondary winding, the secondary portion of the transformer core is caused to saturate so that considerable changes in the magnetizing force applied thereto result in relatively small changes in the flux flowing therein. A polyphase rectifier is energized from a plurality of windings inductively related to the two flux paths of the transformer. Upon loading the rectifier, a change in phase is produced between the fluxes in the two flux paths and polyphase rectification is obtained at the increased values of load on the rectifier. By causing a change from single-phase rectification at light loads to polyphase rectification at heavier loads, an increase in rectified voltage is obtained which may be used to compensate for the voltage drop in the rectifier and in the remainder of the circuit.

This compensating action, together with the effect of the saturation of the secondary core portion, may be used to compensate not only for changes in loading of the rectifiers but also for changes in the input voltage to the transformer, so that a regulated output voltage may be maintained in spite of variations in load and variations in supply voltage. Some of these principles are explained in detail in the Stocker Patent 2,364,558. In my present invention, I employ a modified circuit arrangement particularly in the capacitor circuit which is a closed circuit including the secondary winding. The capacitor, because it is in a closed circuit with the secondary winding, acts to supply magnetizing current to the secondary winding and to maintain a high flux density in the secondary portion of the core of the transformer. By my present invention, I am able to control the voltage on this capacitor in a manner which enables me to maintain a regulated load voltage over a wide range of load currents, to compensate for unusually wide variations in the voltage of the A. C. source, and to compensate for extraordinarily high resistance in the D. C. output circuit of the rectifier. I accomplish these results by including in the closed circuit with the capacitor not merely the secondary winding but also an additional winding on the transformer.

By the use of an additional winding whose voltage opposes the secondary voltage and changes with changing input voltage, the variation in capacitor voltage with changing input voltage may be reduced or even reversed. The additional winding is on either the primary core member or the leakage core member, and its voltage changes in both magnitude and phase relative to the secondary voltage as the load changes. Because of this fact, I am able to regulate the capacitor voltage with respect to load changes, as well as with respect to changes in input voltage. Because the magnetizing force for the secondary or saturable portion of the transformer core comes mainly from the capacitor current, this invention makes it possible to greatly reduce the variations in secondary voltage, by regulating the capacitor voltage and current.

The polyphase rectifier draws load not only from the secondary portion of the transformer core, but also from the primary side or the leakage flux path, depending on the particular circuit arrangement used. The division of load between the phases of the polyphase rectifier depends upon the phase relationships, wave shapes, and relative magnitudes of the voltages, and I have found that the insertion of compensating voltage in the capacitor circuit has a more pronounced effect on the output voltage of the polyphase rectifier than on the R. M. S. voltage across the secondary winding. In the practice of this invention, it is not always necessary, therefore, to completely compensate the capacitor voltage for changes in input voltage.

In one embodiment of this invention, I employ a novel winding arrangement for feeding the polyphase rectifier which further improves the voltage regulation. The details of the operation of my invention may be more fully understood by a detailed explanation of the embodiments shown in the accompanying figures.

In Figure 1 is shown a magnetic core structure having a primary portion 15 and a secondary portion 16. The primary winding 11 on the primary portion 15 is energized from the source of alternating current 10. The secondary winding 13 is wound on the secondary portion 16 and is provided with a tap 14 from which one terminal of the three-phase rectifier 18 is energized. The magnetic shunt members 17 are arranged in the core structure to provide a path for leakage flux to flow through the primary core portion 15 without traversing the secondary core portion 16. The leakage flux path provided by these shunts is preferably arranged with an air gap indicated by the reference character 33. This air gap increases the reluctance of the leakage flux path so that not all of the primary flux is diverted away from the secondary core portion 16. The air gap 33 shown in Figure 1 has a non-uniform or "stepped" cross-section, as will be explained later.

The core structure as shown provides two flux paths, the one path including the primary portion 15 and the secondary portion 16. The second flux path includes the primary portion 15 and the leakage shunts 17. The two flux paths are magnetically in parallel with each other and the primary core portion 15 is common to both flux paths.

The winding 12 is arranged on the primary core portion 15 and is connected on one end both to the winding 13 and to a terminal of the three-phase rectifier 18. The other end of winding 12 is connected to capacitor 22 and to another terminal of the three-phase rectifier 18. The three-phase rectifier 18 is therefore energized from a portion of winding 13 terminated at tap 14, and from winding 12. When the voltage across winding 13 is in phase, or substantially 180 degrees out of phase, with the voltage across winding 12, the rectifier 18 is energized with single-phase voltage. When a load is connected across the direct current terminals 20 and 21, the load is reflected through the polyphase rectifiers to the transformer windings and produces a phase shift between the voltage across winding 13 and the voltage across winding 12. As a result of this phase shift, the action of the rectifier 18 tends to shift toward polyphase rectification, even though a balanced three-phase rectification may never actually be reached. The gradual change from single-phase to polyphase rectification produces an increase in the output voltage of the rectifier 18 because of the principle that a higher output voltage is obtained from polyphase rectification than from single-phase rectification. The transformer and associated elements may be proportioned so that this increase in voltage is just sufficient to compensate for the voltage drop through the windings 12 and 13, the rectifier elements 18 and the filter choke 19. Thus, a constant output voltage may be delivered at the direct current terminals 20 and 21 in spite of variations in the load connected to these terminals. Furthermore, variations in the voltage of source 10 cause relatively little change in the voltage across winding 13 because of the saturation of the secondary core portion 16 and the diversion of flux produced by the leakage flux members 17. The combination of voltages fed to the rectifier 18 from the windings 13 and 12 may therefore be proportioned to provide substantially constant output voltage on terminals 20 and 21 at all values of the voltage of source 10 within a relatively wide operating range.

The capacitor 22 in Figure 1 is connected not only across the winding 13 but across the windings 13 and 12 in series. The polarization of the windings 12 and 13 is such that the voltage across winding 12 subtracts from the voltage across winding 13. The voltage across capacitor 22 is therefore somewhat less than the voltage across winding 13. I have found that this arrangement produces considerably improved results, in particular it is capable of providing a more nearly uniform "climb" or correction for voltage drop in the circuit at all values of input voltage within the operating range than is obtainable when the capacitor 22 is connected directly across winding 13 as in the prior devices. I have also found that the operating voltage of the capacitor 22 may be reduced appreciably by this arrangement without suffering a corresponding reduction in the available output of the regulating arrangement. This provides a saving not only in the capacitor 22 but also in the losses involved in the winding 13 due to the current from capacitor 22.

There appear to be several functions involved in the operation of this improved winding arrangement for supplying voltage to capacitor 22. One direct result appears to be that the voltage across capacitor 22 may be held constant or even be caused to decrease with increasing voltage of source 10, due to the fact that the voltage across winding 12 subtracts from the voltage across winding 13 and therefore provides at high values of input voltage an increased subtracting voltage in the circuit of capacitor 22. Furthermore, with increasing values of load current, the shift in phase between the voltages across windings 12 and 13 helps to sustain the voltage across capacitor 22 at more nearly its normal value or, in some cases, it may even be caused to increase with increasing load. Because of these factors, this improved winding arrangement provides an inherent compensation for changes in input voltage and for changes in load current which cooperates with the previously outlined functions, compensating for variations in input voltage and for variations in load.

A further effect of the improved winding arrangement on the action of the regulating transformer is to provide capacitive excitation for the leakage flux members 17. This excitation is provided because of the polarity of the windings 12 and 13 both of which are carrying the current flowing through capacitor 22. When polarized as previously described, these windings aid each other in magnetizing the leakage members 17. The exact effect of this capacitive excitation is not understood but it appears to aid in the maintenance of the precisely regulated output voltage at extremely light values of load current. This feature of my invention is realized to best advantage when the air gap 33 in the leakage flux path is stepped or non-uniform in accordance with my invention covered by United States patent application Serial No. 547,775, filed August 2, 1944, now United States Patent No. 2,473,662. By combining the stepped air gap construction as shown in Figure 1 with the winding arrangement by which capacitor 22 is fed from both windings 12 and 13, I am able to adjust both the magnetization of the leakage flux members and their permeability at various values of magnetization. Although the complexity of the circuit and core arrangement prevents an actual computation or determination of the magnetizing forces for various values of load current, I have found that through the combination of the winding arrangement shown in Figure 1 and the stepped air gap also shown in Figure 1, I am able to obtain an extremely close regulation of the output voltage delivered at terminals 20 and 21 for all values of load current between no load and the full rated load of the device over the entire operating range of voltage from source 10. Although the stepped or non-uniform air gap 33 is shown only in Figure 1 in this application, it is to be understood that this feature may be applied with similar results to the arrangements shown in Figures 2 and 3.

Figure 2:
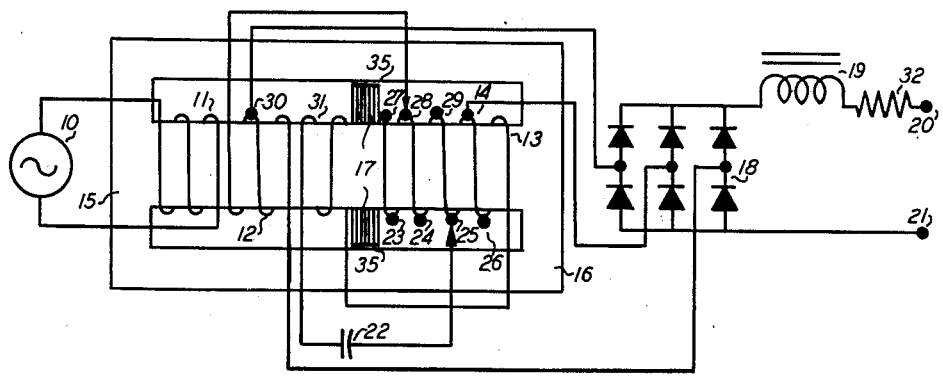
Figure 2 is a modification of the arrangement shown in Figure 1, showing how the transformer windings may be provided with taps for adjusting the output voltage and also showing a modified arrangement for feeding the three-phase rectifier from the transformer windings.

In Figure 2 the windings 11 and 12 are on the primary core portion 15 of the core structure as in Figure 1, and the winding 13 is on the secondary portion 16 of the core structure as in Figure 1. The winding 13 is provided with a series of taps 27, 28 and 29 to which the lead from winding 12 may be adjusted in order to provide an adjustment of the output voltage of the device. This lead is shown in Figure 2 connected to terminal 28 and designated with an arrow to indicate that it is adjustable. In order to provide a further adjustment of the output voltage, the winding 13 is provided with another series of taps 23, 24, 25, 26 to which the lead from capacitor 22 may be connected. An insulated winding 31, in addition to winding 12, is provided on the primary core portion 15 and is connected in series with the winding 13 in the circuit of capacitor 22. The relative polarity of the windings 13 and 31 is the same in Figure 2 as the polarity obtained by connecting windings 13 and 12 in series in Figure 1, so that the voltage across winding 31 opposes the voltage across winding 13 and the voltage developed across capacitor 22 is less than that across winding 13. The tap 14 on winding 13 is connected to an alternating current terminal of the rectifier 18 as in Figure 1. The winding 12 in Figure 2 is provided with a tap 30 to which a second rectifier lead is connected. The third rectifier lead is connected to the end of winding 12 as in Figure 1.

By connecting the alternating current terminal of the rectifier 18 to tap 30 on winding 12 instead of the junction between windings 12 and 13, I am able to provide additional climb or correction for circuit resistance. I have found that this additional climb is obtainable substantially without any reduction in the peak load obtainable from the rectifiers. Furthermore, when the tap 30 on winding 12 is used as shown in combination with the winding arrangement used to energize capacitor 22, by which the voltage across capacitor 22 is controlled, I am able to obtain a precisely regulated output voltage across the direct current terminals 20 and 21 over the entire range of voltage of source 10. The use of tap 30 on winding 12 or an equivalent arrangement may be employed in the circuits shown in Figures 1 and 3 as well as in that shown in Figure 2. This arrangement provides compensating voltage in two of the three alternating current rectifier leads instead of in just one as in prior devices, the compensating voltage for the rectifier in Figure 2 being obtained from winding 12.

In Figure 2 a resistance 32 is shown in the direct current lead between the filter choke 19 and the positive terminal 20. The resistance 32 may represent the resistance of a long set of output leads through which the load is to be supplied or it may represent the internal resistance of an additional control device which is to be energized from the rectified output of my rectifying arrangement. In either case, I am able by this invention to compensate for an extraordinarily high value of voltage drop through the circuit elements both in the alternating current and in the direct current side of the rectifier 18 and to thereby maintain regulated output voltage across the load which may be connected to the direct current terminals 20 and 21.

In Figure 2, the air gap 35 which is shown in series with the magnetic path of the shunt members 17 has a uniform cross-section as distinguished from the stepped air gap 33 shown in Figure 1. The stepped air gap although shown only in Figure 1 may be used in the arrangement shown in Figures 2 and 3 with similar advantages, but many of the advantages of this invention can be obtained even without the use of the stepped air gap. The stepped air gap 33 as described in my prior United States patent application Serial No. 547,775 is in itself a means for obtaining a more precisely regulated output voltage and may be used in my present invention to obtain a still higher degree of precision in the regulation of the output voltage, and to extend the range of load currents and input voltages over which a regulated output voltage may be obtained.

Figure 3:
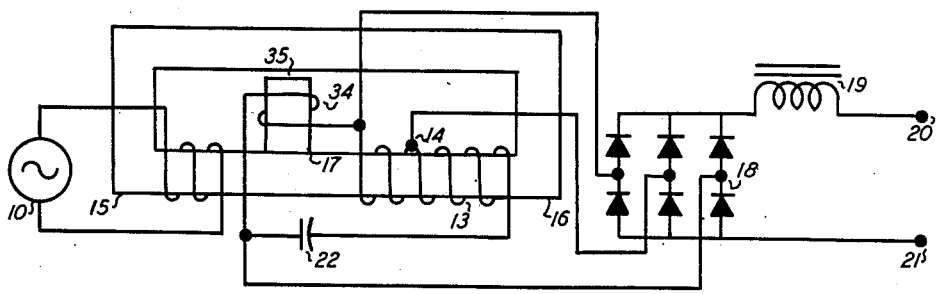
Figure 3 shows still another modification of the circuit of Figure 1, in which a winding is placed on the leakage flux member.

The circuit shown in Figure 3 is that of another embodiment of my invention employing a single-sided core construction instead of the complete shell-type core shown in Figures 1 and 2. It will be apparent that the shell-type core and the single-sided core are for these purposes substantially equivalent and interchangeable between the circuits shown in the various figures. The circuit of Figure 3 differs from those of Figures 1 and 2 in that it uses a winding on the magnetic shunt member instead of on the primary core member. The winding 34 on the shunt member 17 in Figure 3 serves both as a supply winding for the polyphase rectifier 18 and as a compensating winding in the circuit of capacitor 22. As in Figure 1, the winding 34 is polarized with respect to winding 13 so that the voltage applied across capacitor 22 is less than the voltage across winding 13. The voltage across winding 34 changes somewhat more rapidly than does the voltage across winding 12 in Figure 1 and the proportioning of the windings is altered somewhat in Figure 3 from that used in Figure 1. The principle of operation of the circuit shown in Figure 3 is nevertheless similar to that already described for Figures 1 and 2. The voltage developed across winding 34 shifts in phase with the load applied to the rectifiers 18, resulting in a change from a substantially single-phase rectification at light loads to polyphase rectification at heavy loads thereby providing a voltage increase sufficient to counteract the voltage drops through the circuit elements. This same shift in phase acts to regulate the voltage across capacitor 22 in a manner which aids in the maintenance of constant voltage across the output terminals 20 and 21. Furthermore, the reduction in voltage across capacitor 22 below that existing across winding 13 results in a more economical operation both of the capacitor and of the windings.

It will be noted that in Figure 2 the winding 31 is connected in series with the capacitor 22 whereas the winding 30 is connected in series with an alternating current lead to the rectifier 18. The windings 30 and 31 do not necessarily have to have the same number of turns and it is therefore possible to insert a different voltage in the circuit of capacitor 22 from the coupling with the primary core section 15 than is inserted in series with the alternating current lead to the rectifier 18 from the same coupling. Although the circuits shown in Figures 1 and 3 are both arranged to couple the same voltage in series with capacitor 22 as is coupled in series with the alternating current lead to the rectifier 18, it will be apparent that the windings 12 and 34 may be provided with taps to provide the same flexibility of turn ratios as is provided with the arrangement of Figure 2. The general principle of operation of the circuit of Figure 3 is essentially the same as that of Figures 1 and 2, the magnetizing force of the capacitive current flowing through capacitor 22 acts on the secondary core portion through winding 13 to saturate the secondary core portion 16. In Figure 3 it is also more apparent that the magnetizing current through winding 34 due to the current flow through capacitor 22 acts directly on the leakage flux path. The windings may be proportioned in such a way as to maintain the voltage across capacitor 22, more nearly constant than would be obtainable were the capacitor 22 connected only across winding 13. The effect of the capacitive magnetization of the leakage flux path is not as pronounced with the uniform gap 35 shown in Figures 2 and 3 as it is with the non-uniform gap 33 shown in Figure 1. When the leakage flux path has a non-linear magnetization characteristic as provided by the stepped air gap 33, the application of a relatively constant capacitive magnetizing current across the leakage flux path changes the permeability of the leakage flux path for a given operating condition. On the other hand, when the leakage flux path has a relatively linear magnetization characteristic as obtained with the use of the uniform air gap 35, the capacitive magnetizing current impressed across the leakage flux path will not noticeably change its permeability. This does not mean, however, that the operation of the rectifying arrangement is not markedly influenced by the provision of the additional winding in series with the capacitor, because it actually reorganizes the operation of the device. The flux condition produced by the connection of capacitor 22 in the circuit arrangement shown in Figures 1, 2 and 3 is of a decidedly different nature than that obtained with the prior art arrangement in which the capacitor 22 was connected directly across winding 13. There are, in fact, two operating changes produced by my present invention, the one resulting from the redistribution of flux caused by the connection of the capacitor 22 across the two windings in series, and the other resulting from the fact that the capacitive current through winding 13 is controlled according to the load as a result of the regulation and control of the voltage across capacitor 22. The flux in the saturable core portion 16 is thereby influenced in a manner which permits the maintenance of a precisely regulated voltage across the output terminals 20 and 21.

It should be pointed out that the drawings shown herein are diagrammatic in nature and are not intended to show the proportioning or the configuration of the magnetic core structures nor the proportioning of the windings. Various modifications known in the art may be applied to the structure used without departing from the practice of my invention.

Although I have described my invention with a certain degree of particularity and by reference to specific examples, it is understood that the present disclosure has been made by way of example and that numerous changes in the details of construction and the combination and arrangement of the parts may be resorted to without departing from the spirit and the scope of my invention as hereinafter claimed.

I claim as my invention:

1. A rectifying arrangement comprising, in combination, a polyphase rectifier having first and second rectifying portions with common direct current output terminals, a magnetic core having first and second magnetic flux paths with a common portion, winding means on said common portion adapted to be energized from a source of single-phase alternating current, said first flux path having a saturable portion, said second flux path having a non-magnetic gap therein, first winding means on the saturable portion, second winding means on the common portion, a capacitor, said capacitor being connected in a closed circuit including at least a portion of the first winding means and at least a portion of the second winding means, a first energizing circuit for said first rectifying portion, and a second energizing circuit for said second rectifying portion, said first energizing circuit including at least a portion of said first winding means, said second energizing circuit including at least a portion of said second winding means.

2. A rectifying arrangement comprising in combination, a magnetic core having a primary member, a secondary member, and a leakage flux member, first winding means on the primary member adapted to be energized from a source of single-phase alternating current, said secondary member being saturable, said leakage flux member having a non-uniform non-magnetic gap therein, second winding means having first and second portions, said first portion being on the secondary member, said second portion being on one of said other members, a capacitor, said capacitor being connected in a closed circuit with said first and second portions of the second winding means, and a polyphase rectifier having first and second rectifying portions with common direct current output terminals, said first rectifying portion being energized from said first portion of the second winding means, said second rectifying portion being energized from said second portion of the second winding means.

3. A rectifying arrangement comprising in combination, a magnetic core having a primary member, a secondary member, and a leakage flux member, first winding means on the primary member adapted to be energized from a source of single-phase alternating current, said secondary member being saturable, second winding means having first and second portions, said first portion being on the secondary member, said second portion being on one of said other members, a capacitor, said capacitor being connected in a closed circuit with said first and second portions of the second winding means, and a polyphase rectifier having first and second rectifying portions with common direct current output terminals, said first rectifying portion being energized from said first portion of the second winding means, said second rectifying portion being energized from said second portion of the second winding means.

4. A rectifying arrangement comprising, in combination, a magnetic core structure having primary and secondary core portions and a leakage flux path, first winding means having its turns on said primary core portion, means for energizing turns of said first winding means from a source of single-phase alternating current, second winding means having its turns on the secondary core portion, a capacitor, a closed circuit including said capacitor and turns on said first and said second winding means, a polyphase rectifier having first and second rectifying circuits, direct current output terminals common to both of said circuits, circuit means for energizing the first rectifying circuit from turns of said first winding means, and circuit means for energizing said second rectifying circuit from turns of said second winding means.

5. A rectifying arrangement comprising, in combination, a magnetic core having first and second magnetic flux paths with a common portion, first winding means on said common portion adapted to be energized from a source of single-phase alternating current, said first flux path being saturable, said second flux path having a non-magnetic gap therein, second winding means having its turns on said first flux path, third winding means having its turns on said second flux path, a capacitor, a closed circuit including said capacitor and turns on said first and second winding means, a polyphase rectifier having first and second rectifying circuits, direct current output terminals common to both of said circuits, circuit means for energizing the first rectifying circuit from turns of said second winding means, and circuit means for energizing the second rectifying circuit from turns of said third winding means.

6. A rectifying arrangement comprising, in combination, a magnetic core having first and second magnetic flux paths with a common portion, first winding means on said common portion adapted to be energized from a source of single-phase alternating current, said first flux path being saturable, said second flux path having a non-uniform non-magnetic gap therein, second winding means having its turns on said first flux path, third winding means having its turns on said second flux path, a capacitor, a closed circuit including said capacitor and turns on said first and second winding means, a polyphase rectifier having first and second rectifying circuits, direct current output terminals common to both of said circuits, circuit means for energizing the first rectifying circuit from turns of said second winding means, and circuit means for energizing the second rectifying circuit from turns of said third winding means.

7. A rectifying arrangement comprising, in combination, a magnetic core having first and second magnetic flux paths having a common portion, first winding means on the common portion adapted to be energized from a source of single-phase alternating current, said first flux path having a saturable portion, said second flux path having a non-magnetic gap therein, second winding means having its turns on said saturable portion, a capacitor, a closed circuit including turns of said second winding means and said capacitor, third winding means having its turns on said second flux path, a polyphase rectifier having first, second and third alternating current terminals, a first energizing circuit extending from the first to the second terminal and including turns of said second winding means in series with turns of said third winding means, a second energizing circuit extending from said second to said third terminal and including turns of said third winding means, means for supplying a load with direct current from said polyphase rectifier.

8. A rectifying arrangement comprising, in combination, a magnetic core having first and second magnetic flux paths having a common portion, first winding means on the common portion adapted to be energized from a source of single-phase alternating current. Said first flux path having a saturable portion, said second flux path having a non-magnetic gap therein, second winding means having its turns on said saturable portion, third winding means having its turns on said second flux path, a capacitor, a closed circuit including turns of said second winding means, turns of said third winding means, and said capacitor, a polyphase rectifier having first, second and third alternating current terminals, a first energizing circuit extending from the first to the second terminal and including turns of said winding means and turns of said third winding means, a second energizing circuit extending from the second to the third terminal and including turns of said third winding means, and output circuit means for supplying a load with rectified current from said polyphase rectifier.

9. A rectifying arrangement comprising, in combination, a magnetic core structure having primary and secondary core portions and a leakage flux path, first winding means on said primary portion adapted to be energized from a source of alternating current, said secondary core portion being saturable, second winding means having its turns on the secondary core portion, third winding means having its turns on the leakage flux path, a capacitor, a closed circuit including turns of said second and third winding means and said capacitor, a polyphase rectifier having first and second rectifying circuits with common direct current output terminals, means for energizing the first rectifying circuit from turns of said second winding means and means for energizing the second rectifying circuit from turns of the third winding means.

GEORGE H. POHM.

REFERENCES CITED

The following references are of record in the file of this patent:

UNITED STATES PATENTS

| Number | Name | Date |
| --- | --- | --- |
| 2,364,558 | Stocker | Dec. 5, 1944 |
| 2,442,960 | Pohm | June 8, 1948 |
| 2,453,263 | Potter | Nov. 9, 1948 |

FOREIGN PATENTS

| Number | Country | Date |
| --- | --- | --- |
| 546,976 | Great Britain | Aug. 7, 1942 |